United States Patent
Lin et al.

(10) Patent No.: US 11,548,588 B2
(45) Date of Patent: Jan. 10, 2023

(54) EFFORT-SAVING CRANK STRUCTURE AND ASSEMBLY OF BICYCLE

(71) Applicants: Hsuan-Chih Lin, New Taipei (TW); Chun-Cheng Lee, Taichung (TW)

(72) Inventors: Hsuan-Chih Lin, New Taipei (TW); Chun-Cheng Lee, Taichung (TW)

( * ) Notice: Subject to any disclaimer, the term of this patent is extended or adjusted under 35 U.S.C. 154(b) by 0 days.

(21) Appl. No.: 17/575,229

(22) Filed: Jan. 13, 2022

(65) Prior Publication Data
US 2022/0227453 A1 Jul. 21, 2022

(30) Foreign Application Priority Data
Jan. 20, 2021 (TW) .................... 110102157

(51) Int. Cl.
*B62M 1/36* (2013.01)
*B62M 3/00* (2006.01)
*B62M 11/02* (2006.01)

(52) U.S. Cl.
CPC ............... *B62M 1/36* (2013.01); *B62M 3/00* (2013.01); *B62M 11/02* (2013.01); *B62M 2003/006* (2013.01)

(58) Field of Classification Search
CPC .......... B62M 1/36; B62M 3/00; B62M 3/003; B62M 2003/006; B62M 3/04; B62M 11/02; F16H 21/18
See application file for complete search history.

(56) References Cited

U.S. PATENT DOCUMENTS

| | | | |
|---|---|---|---|
| 627,086 A * | 6/1899 | Anderson | B62M 3/00 475/182 |
| 6,830,259 B2 * | 12/2004 | Jakovljevic | B62M 3/04 280/260 |
| 7,520,196 B2 * | 4/2009 | Stallard | B62M 3/04 74/594.1 |

(Continued)

FOREIGN PATENT DOCUMENTS

| | | |
|---|---|---|
| CH | 225699 A | 2/1943 |
| CH | 680465 A5 | 8/1992 |

(Continued)

OTHER PUBLICATIONS

Machine translation of CN 111434574 A obtained on Aug. 23, 2022.*

(Continued)

*Primary Examiner* — Adam D Rogers
(74) *Attorney, Agent, or Firm* — Chun-Ming Shih; HDLS IPR Services

(57) ABSTRACT

The present disclosure related to an effort-saving crank structure (1) of a bicycle (8), which includes: a crank mechanism (10) having a crank (11), a shaft end gear (12) and a treadle end gear (13) disposed on the crank (11); a transmission mechanism (20) disposed in the crank (11) and having a rotation shaft (21) and a first gear (22) and a second gear (23) connected to the rotation shaft (21), the first gear (22) and the shaft end gear (12) are engaged for transmission, and the second gear (23) and the treadle end gear (13) are engaged for transmission; a rotation arm unit (30) having a first rotation arm (31) and a second rotation arm (32), two ends of the second rotation arm (32) are respectively connected to the first rotation arm (31) and the treadle end gear (13).

14 Claims, 9 Drawing Sheets

(56) References Cited

U.S. PATENT DOCUMENTS

| | | | |
|---|---|---|---|
| 2005/0263978 A1* | 12/2005 | Ascher | B62M 9/08 |
| | | | 280/261 |
| 2007/0137427 A1 | 6/2007 | Stallard | |
| 2010/0175947 A1* | 7/2010 | Chang | B62M 17/00 |
| | | | 180/385 |
| 2021/0163095 A1* | 6/2021 | Schmidt | B62M 1/36 |

FOREIGN PATENT DOCUMENTS

| | | | |
|---|---|---|---|
| CN | 105947090 A | * | 9/2016 |
| CN | 207015537 U | | 2/2018 |
| CN | 108928425 A | * | 12/2018 |
| CN | 111434574 A | | 7/2020 |
| FR | 1002832 A | | 3/1952 |
| FR | 3042774 A1 | | 4/2017 |

OTHER PUBLICATIONS

Machine translation of FR 1002832 A obtained on Aug. 23, 2022.*
Search Report dated Jun. 1, 2022 of the corresponding European patent application No. 22151465.6.
Search Report dated Jun. 28, 2022 of the corresponding British patent application No. GB2200692.8.

* cited by examiner

EFFORT-SAVING CRANK STRUCTURE AND ASSEMBLY OF BICYCLE

BACKGROUND OF THE DISCLOSURE

Technical Field

The present disclosure relates to a crank structure technology of a bicycle, particularly to an effort-saving crank structure and assembly of a bicycle.

Description of Related Art

For health and reducing the discharging amount of toxic gas and carbon, people may take some time to exercise, for example jogging, running, or riding a bicycle, wherein riding a bicycle has short or mid travelling effects, and the rider may have his/her body and soul relieved during the ride. Moreover, there are many dedicated bicycle lanes provided in many cities, thus riding bicycle becomes one of the most popular exercises in the society.

A crank of a related-art bicycle is a rod member with a fixed length and used for connecting a treadle and a central shaft of the bicycle. During an operation process of the bicycle, the user pedals the treadle to make a circular motion be performed with the length of the crank as a radius and the central shaft of the treadle as a rotation center, and driving devices, for example gear disks, a chain, of the bicycle are driven to make the bicycle to forwardly move.

For the related-art crank device commonly used in the bicycle, the crank may not be prolonged for increasing a length of a force arm when the treadle is rotated to a position where an external force is required to be applied, thus an effect of increasing the moment may not be provided. Moreover, for a design of the crank being provided with a retractable feature, the design of retractable crank does not comply with the ergonomics and a circular motion with regularity and inertia may not be performed. As such, it is an effort-wasting design, and the structure of the treadle crank device is complicated and may cause the user to be tired easily. Accordingly, the applicant of the present disclosure has devoted himself for improving the mentioned disadvantages.

SUMMARY OF THE DISCLOSURE

The present disclosure is to provide an effort-saving crank structure and assembly of a bicycle, in which an effort-saving effect may be achieved by a force applying arm consisted of a rotation arm unit and a crank, thus a simple structure is provided and a stable transmission may be established through a circular motion.

Accordingly, the present disclosure provides an effort-saving crank structure of a bicycle, which includes a crank mechanism, a transmission mechanism, and a rotation arm unit. The crank mechanism has a crank, a shaft end gear disposed on one end of the crank and a treadle end gear disposed on another end of the crank. The transmission mechanism is disposed in the crank and has a rotation shaft and a first gear and a second gear connected to two ends of the rotation shaft, the first gear and the shaft end gear are engaged for transmission, and the second gear and the treadle end gear are engaged for transmission. The rotation arm unit has a first rotation arm and a second rotation arm, and two ends of the second rotation arm are respectively connected to one end of the first rotation arm and the treadle end gear.

Accordingly, the present disclosure provides an effort-saving crank assembly of a bicycle, the bicycle has a central shaft engage seat, and the effort-saving crank assembly includes a central shaft, a set of effort-saving crank structures and a set of abutting members. The central shaft is disposed in the central shaft engage seat. Each of the effort-saving crank structures is connected to one end of the central shaft, and each of the effort-saving crank structures has a crank mechanism, a transmission mechanism and a rotation arm unit. The crank mechanism has a crank, a shaft end gear disposed on one end of the crank and a treadle end gear connected to another end of the crank. The transmission mechanism is disposed in the crank and has a rotation shaft and a first gear and a second gear disposed at two ends of the rotation shaft, the first gear and the shaft end gear are engaged for transmissions, and the second gear and the treadle end gear are engaged for transmissions. The rotation arm unit has a first rotation arm and a second rotation arm, and two ends of the second rotation arm are respectively connected to one end of the first rotation arm and the treadle end gear. Each of the abutting members is adapted to sheathe each of the shaft end gears and located between each of the cranks and the central shaft engage seat.

Advantages achieved by the present disclosure are as follows. During the process of pedaling the treadle to make the crank perform a circular motion, poor transmission, for example having a top dead center or a bottom dead center or having a jamming situation, may be avoided. With the transmission established by bevel inclined teeth and bevel gears, a tight contact may be achieved whether the crank is normally or reversely rotated, thereby reducing the noise and effectively increasing the transmission performance and the positioning precision. With an arc-shaped design of the first rotation arm and the second rotation arm, a situation of a front wheel contacting the rotation arm unit may be avoided. With each sleeve slot being combined with each insertion block, each of the rotation arms may be effectively prevented from being bent, deformed, or dislocated while being operated for a long time.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION OF THE DISCLOSURE

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
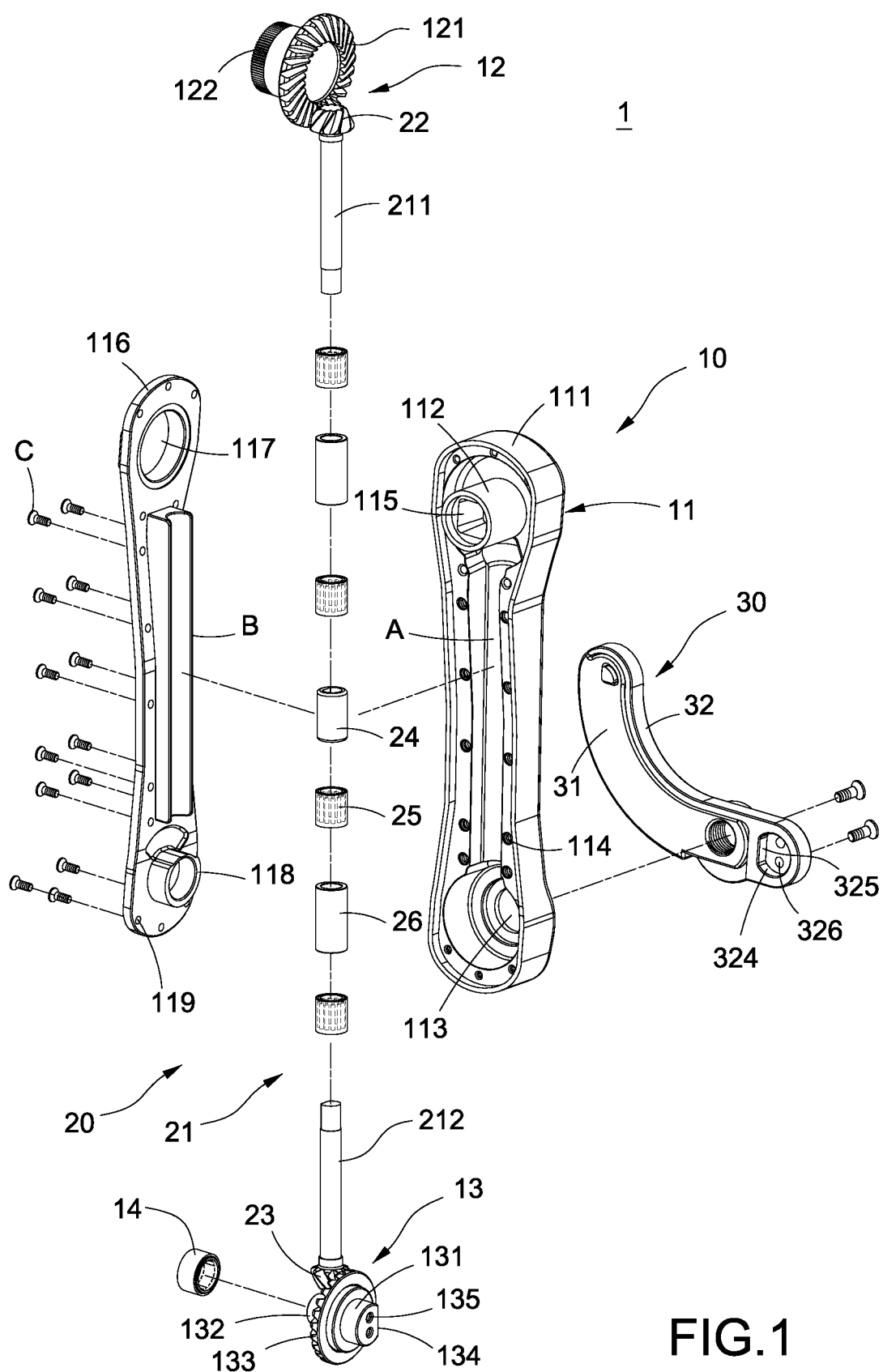
FIG. 1 is an exploded view showing an effort-saving crank structure of a bicycle according to the present disclosure.
Figure 2:
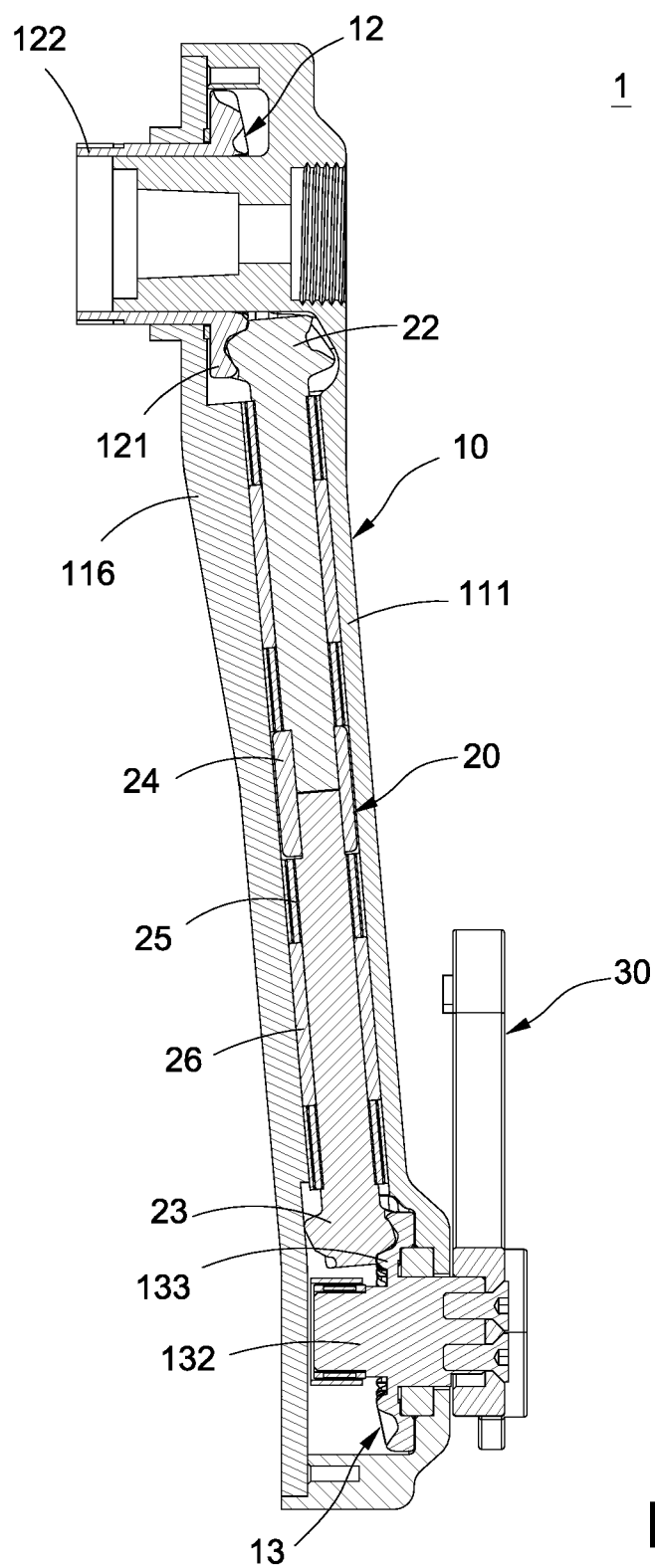
FIG. 2 is a cross sectional view showing the assembly of the effort-saving crank structure of a bicycle according to the present disclosure.
Figure 3:
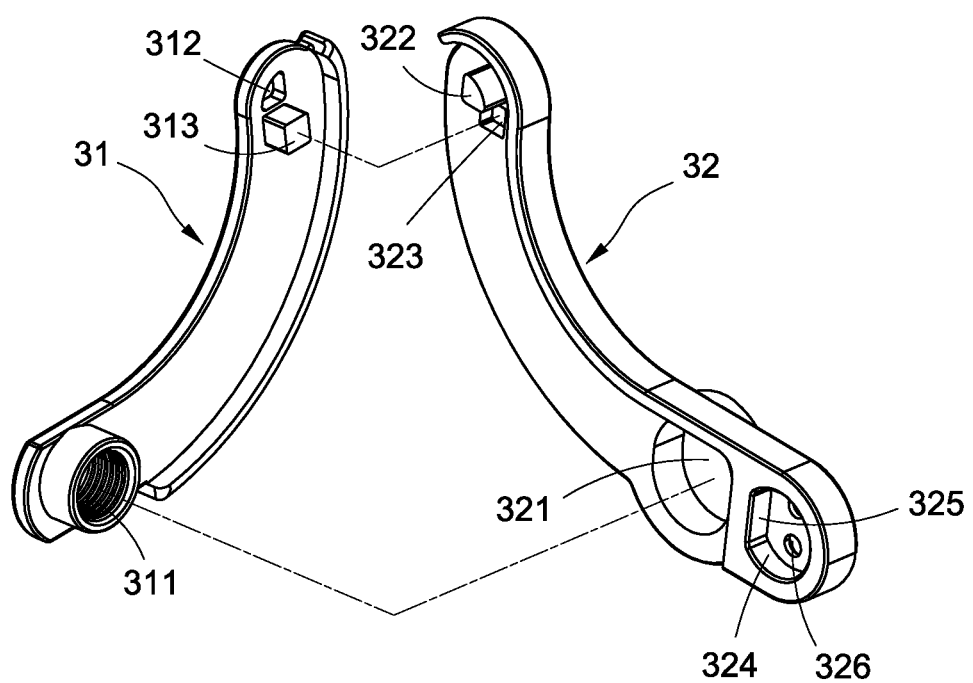
FIG. 3 is an exploded view showing the rotation arm unit according to the present disclosure.
Figure 4:
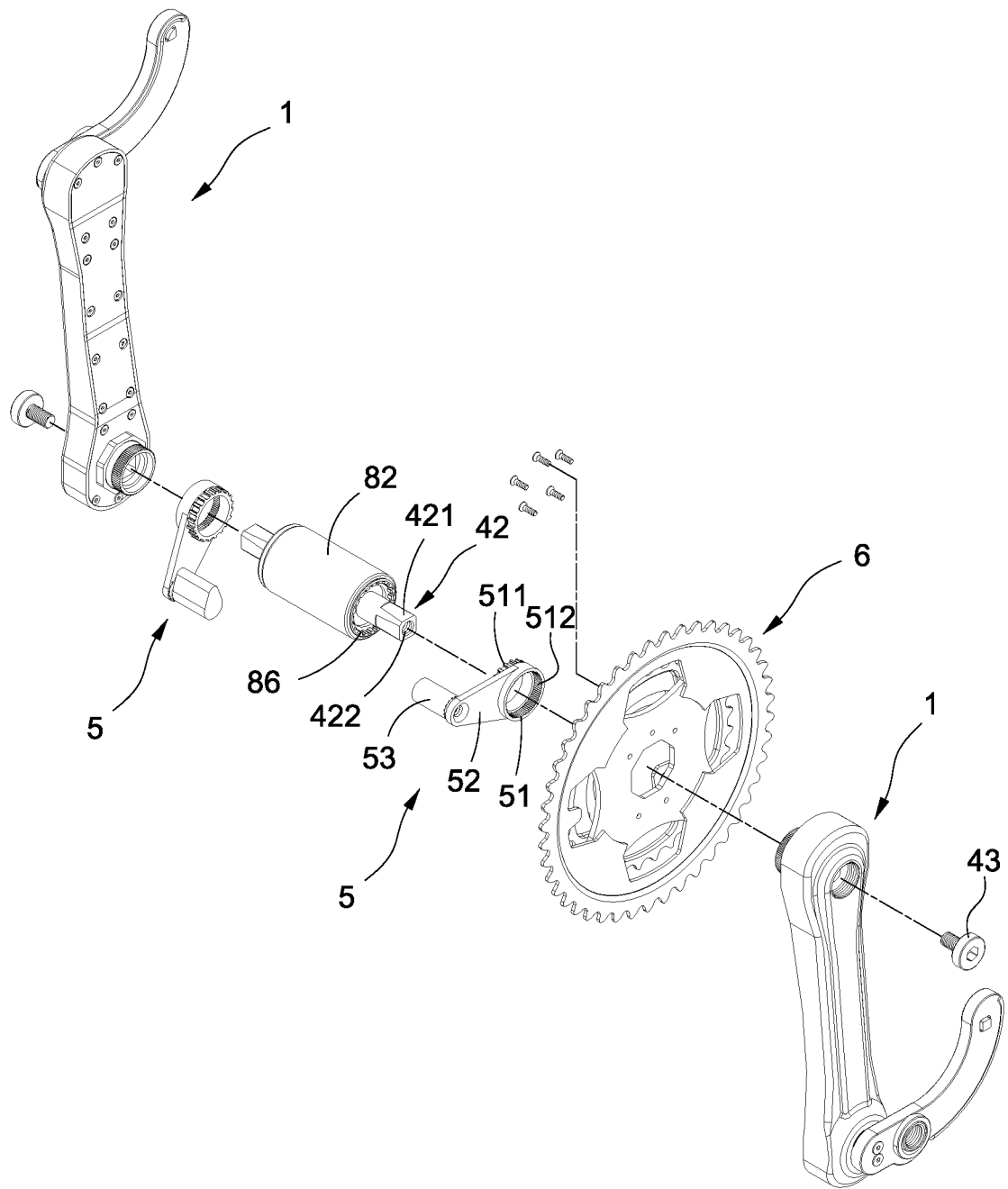
FIG. 4 is an exploded view showing an effort-saving crank assembly according to the present disclosure.
Figure 5:
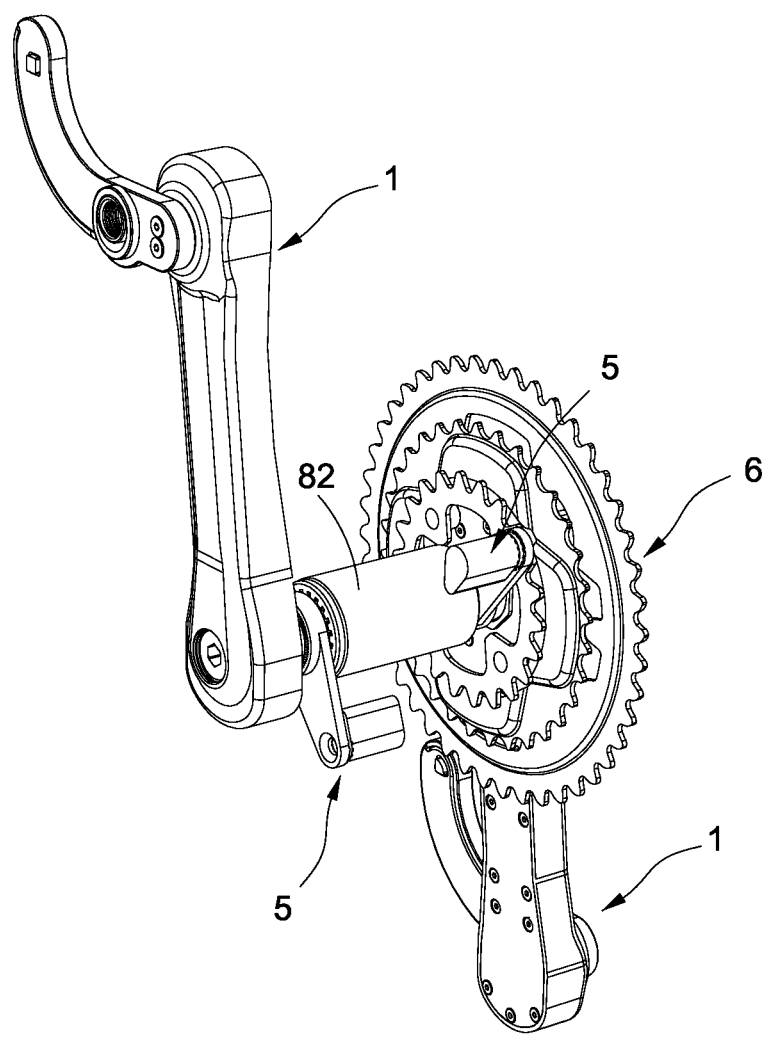
FIG. 5 is a structural view showing the effort-saving crank assembly according to the present disclosure.
Figure 6:
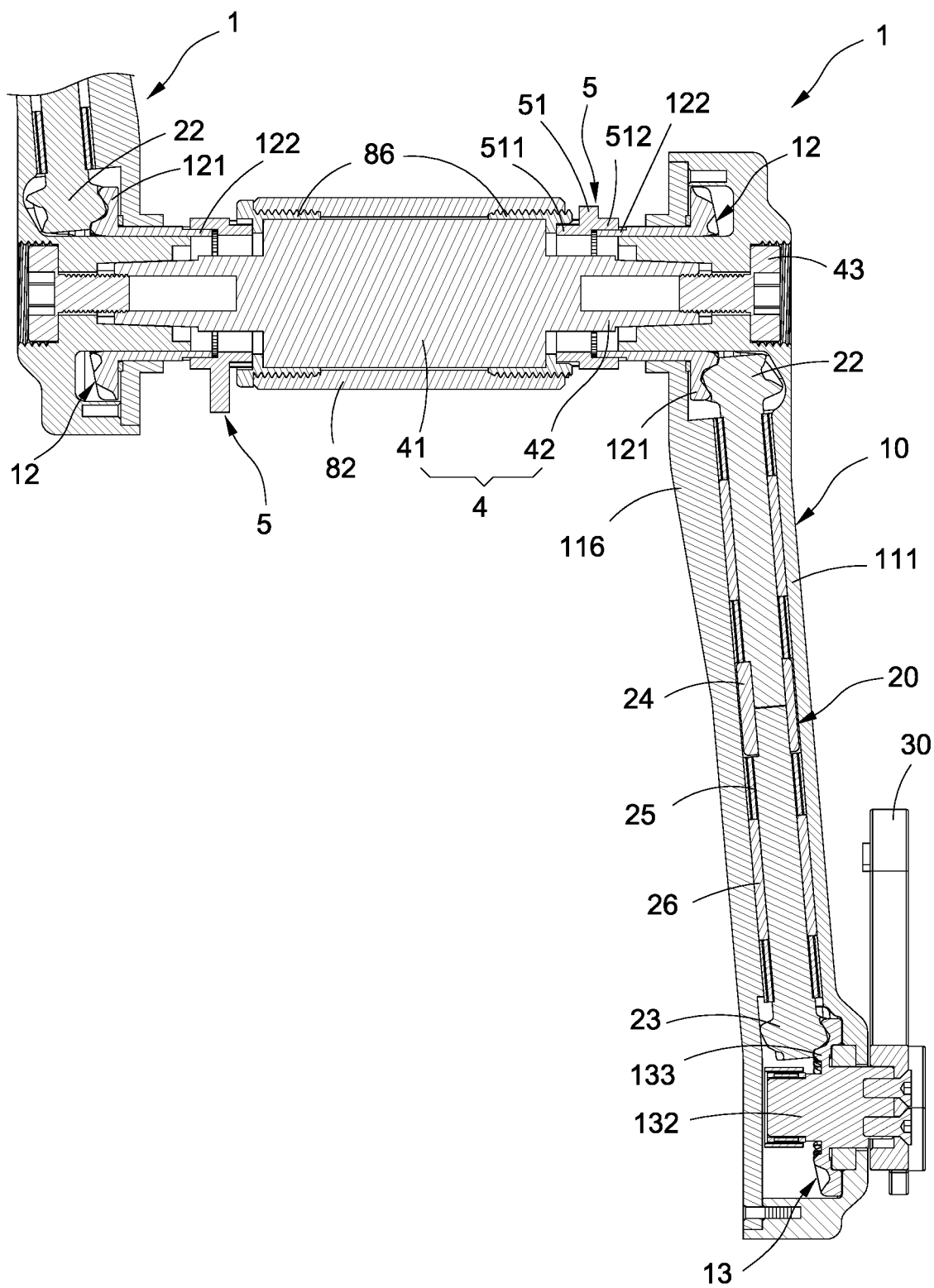
FIG. 6 is a structural cross sectional view showing the effort-saving crank assembly according to the present disclosure.
Figure 7:
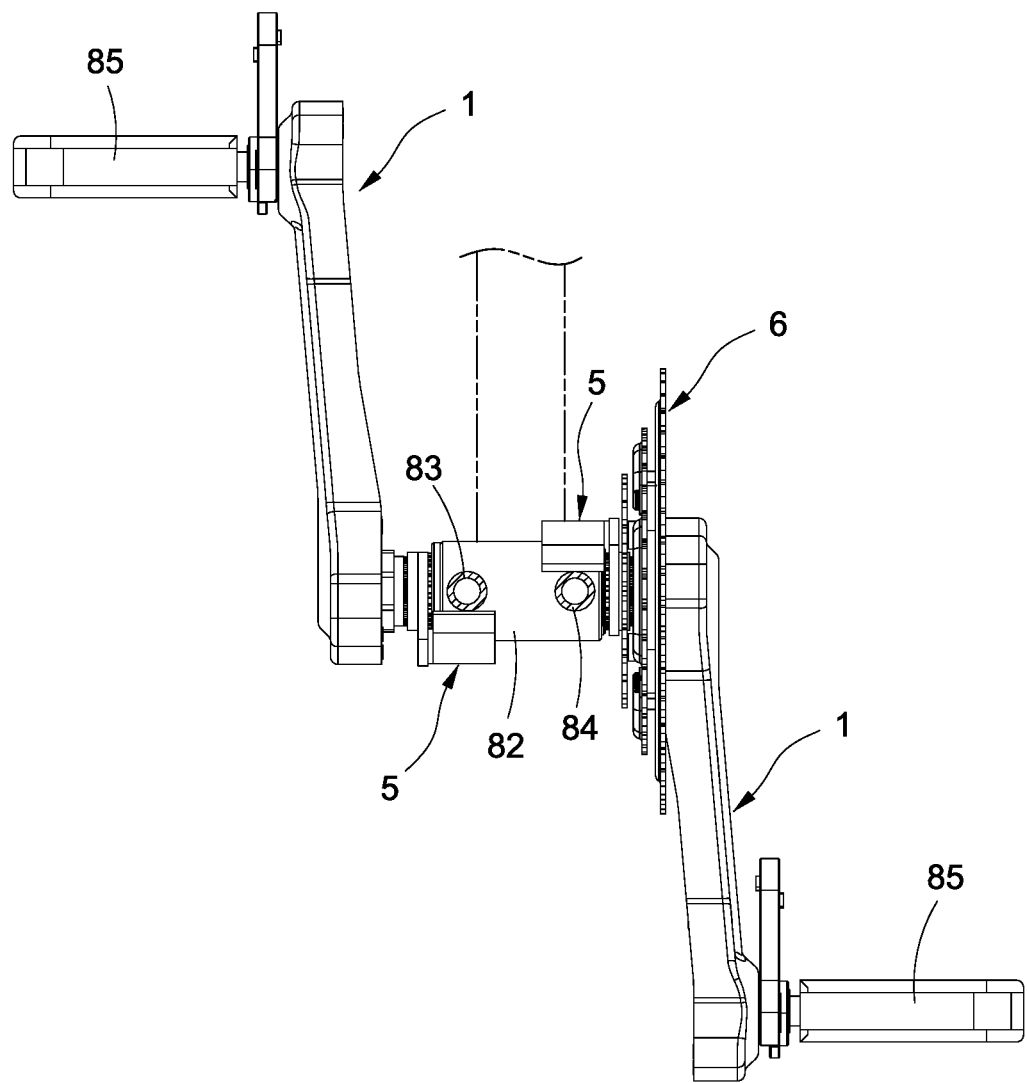
FIG. 7 is a structural view showing the effort-saving crank assembly being combined with the treadle and the frame according to the present disclosure.

Please refer from FIG. 1 to FIG. 3, the present disclosure provides an effort-saving crank structure of a bicycle, the crank structure mainly includes a crank mechanism 10, a transmission mechanism 20 and a rotation arm unit 30.

The crank mechanism 10 mainly includes a crank 11, a shaft end gear 12 and a treadle end gear 13. In some embodiments, the crank 11 mainly includes an outer housing 111 and an inner housing 116, one end of the outer housing 111 is extended with a round column 112 and another end of the outer housing 111 is formed with a first connection hole 113, and an accommodation slot A is formed in the outer housing 111 and located between the round column 112 and the first connection hole 113. A plurality of screw holes 114 are evenly distributed at a periphery of an inner surface of the outer housing 111, and a rectangular conical hole 115 is formed in the round column 112.

A shape of the inner housing 116 is corresponding to a shape of the outer housing 111. One end of the inner housing 116 is formed with a second connection hole 117, and another end of the inner housing 116 is formed with a shaft sleeve 118, and the shaft sleeve 118 is disposed corresponding to the first connection hole 113. A convex rib B is extended in the inner housing 116 and located between the second connection hole 117 and the shaft sleeve 118, and the convex rib B is mounted and fastened corresponding to the accommodation slot A. A plurality of penetrated holes 119 are evenly distributed at a periphery of the inner housing 116, and each of the penetrated holes 119 is disposed corresponding to each of the screw holes 114 to allow a fastening member C, for example a screw, to pass and lock.

The shaft end gear 12 is a fixed gear (i.e., being fixed and not rotary), adapted to sheathe the round column 112 and received in the second connection hole 117 to make the shaft end gear 12 be supported between the round column 112 and the inner housing 116. A plurality of bevel inclined teeth 121 are annularly disposed on one side of the shaft end gear 12, and a plurality of mounting strips 122 are disposed on another side of the shaft end gear 12 away from each of the bevel inclined teeth 121.

The treadle end gear 13 is a rotary gear (i.e., being driven by the transmission mechanism 20 to rotate during the crank 11 is operated to be rotated). A front end and a rear end of the treadle end gear 13 are respectively extended with a front convex column 131 and a rear convex column 132. The front convex column 131 is disposed corresponding to the first connection hole 113, the rear convex column 132 is jointly disposed in the shaft sleeve 118 with a bearing 14 to make the treadle end gear 13 be supported between the outer housing 111 and the inner housing 116. A plurality of bevel inclined teeth 133 are annularly disposed on one side of the treadle end gear 13, the front convex column 131 of the treadle end gear 13 has a positioning plane 134, and an end surface of the front convex column 131 has two positioning holes 135. The transmission mechanism 20 is disposed in the crank 11, and mainly includes a rotation shaft 21, a first gear 22 and a second gear 23. The first gear 22 and the second gear 23 are connected to two ends of the rotation shaft 21, and the first gear 22 and the second gear 23 are both a bevel gear. The first gear 22 and the shaft end gear 12 are engaged for transmission, and the second gear 23 and the treadle end gear 13 are engaged for transmission. A gear ratio of the first gear 22 and the shaft end gear 12 is 1:3, a gear ratio of the second gear 23 and the treadle end gear 13 is 1:3 to provide a desirable transmission, and gear teeth of the treadle end gear 13 may be equal to or smaller than gear teeth of the shaft end gear 12.

The transmission mechanism 20 further includes a connection shaft sleeve 24, a plurality of fixed shaft sleeves 25 and a plurality of positioning shaft sleeves 26. In some embodiments, the rotation shaft 21 includes a first rotation shaft 211 and a second rotation shaft 212. The first gear 22 is connected to one end of the first rotation shaft 211, the second gear 23 is connected to one end of the second rotation shaft 212, the connection shaft sleeve 24 is adapted to sheathe another end of the first rotation shaft 211 and another end of the second rotation shaft 212, and the connection shaft sleeve 24 is rotated with the first rotation shaft 211 and the second rotation shaft 212. The fixed shaft sleeves 25 are adapted to sheathe the first rotation shaft 211 and the second rotation shaft 212 at intervals, and fixedly disposed between the convex rib B of the inner housing 116 and the accommodation slot A of the outer housing 111. Each of the positioning shaft sleeves 26 are adapted to sheathe the first rotation shaft 211 and the second rotation shaft 212 at intervals, and disposed between any two of the adjacent fixed shaft sleeves 25.

The rotation arm unit 30 includes a first rotation arm 31 and a second rotation arm 32. The first rotation arm 31 and the second rotation arm 32 are both an arc-shaped rotation arm. The first rotation arm 31 is formed between the crank 11 and the second rotation arm 32, and has a treadle connecting column 311, and another end of the first rotation arm 31 away from the treadle connecting column 311 is disposed with a sleeve slot 312 and an insertion block 313. The second rotation arm 32 has a penetrated hole 321, and one end thereof away from the penetrated hole 321 is disposed with a mounting block 322 and an engage slot 323. The treadle connecting column 311 is disposed in the penetrated hole 321, and the engage slot 323 and the mounting block 322 are correspondingly combined with the insertion block 313 and the sleeve slot 312 of the first rotation arm 31.

A mounting slot 324 is formed at a lateral side of the penetrated hole 321 and located at an inner side of the second rotation arm 32, a latching plane 325 is formed in the mounting slot 324, and the second rotation arm 32 has two through holes 326 communicating with the mounting slot 324. The front convex column 131 is disposed in the mounting slot 324, the latching plane 325 of the second rotation arm 32 and the positioning plane 134 of the front convex column 131 are mutually latched, and each of the positioning holes 135 of the front convex column 131 is disposed corresponding to each of the through holes 326 to allow a fastening member, for example a screw, to pass and locked.

Please refer from FIG. 4 to FIG. 7, the present invention also provides an effort-saving crank assembly mainly including a central shaft 4, a set of effort-saving crank structures 1 and a set of abutting members 5.

The central shaft 4 mainly includes a main shaft segment 41 and an extending segment 42 outwardly extended from two ends of the main shaft segment 41. The extending segment 42 has a rectangular conical column 421 to allow the round column 112 to sheathe and be combined via the rectangular conical hole 115. An end surface of the extending segment 42 has a screw hole 422 to allow a screw bolt 43 to pass and lock.

Each of the abutting members 5 mainly includes a ring member 51, an arm member 52 extended from the ring member 51 and an abutting rod 53 connected to one end of the arm member 52 away from the ring member 51. A plurality of mounting protrusions 511 are disposed at an outer periphery of the ring member 51, a plurality of mounting slots 512 are disposed on an inner circumferential wall of the ring member 51, and each of the insertion strips 122 of the shaft end gear 12 is mounted in each of the mounting slots 512.

The effort-saving crank assembly of the present disclosure further includes a chain wheel 6 adapted to sheathe the round column 112 of the shaft end gear 12 and disposed between one of the cranks 11 and one of the abutting members 5.

Figure 8:
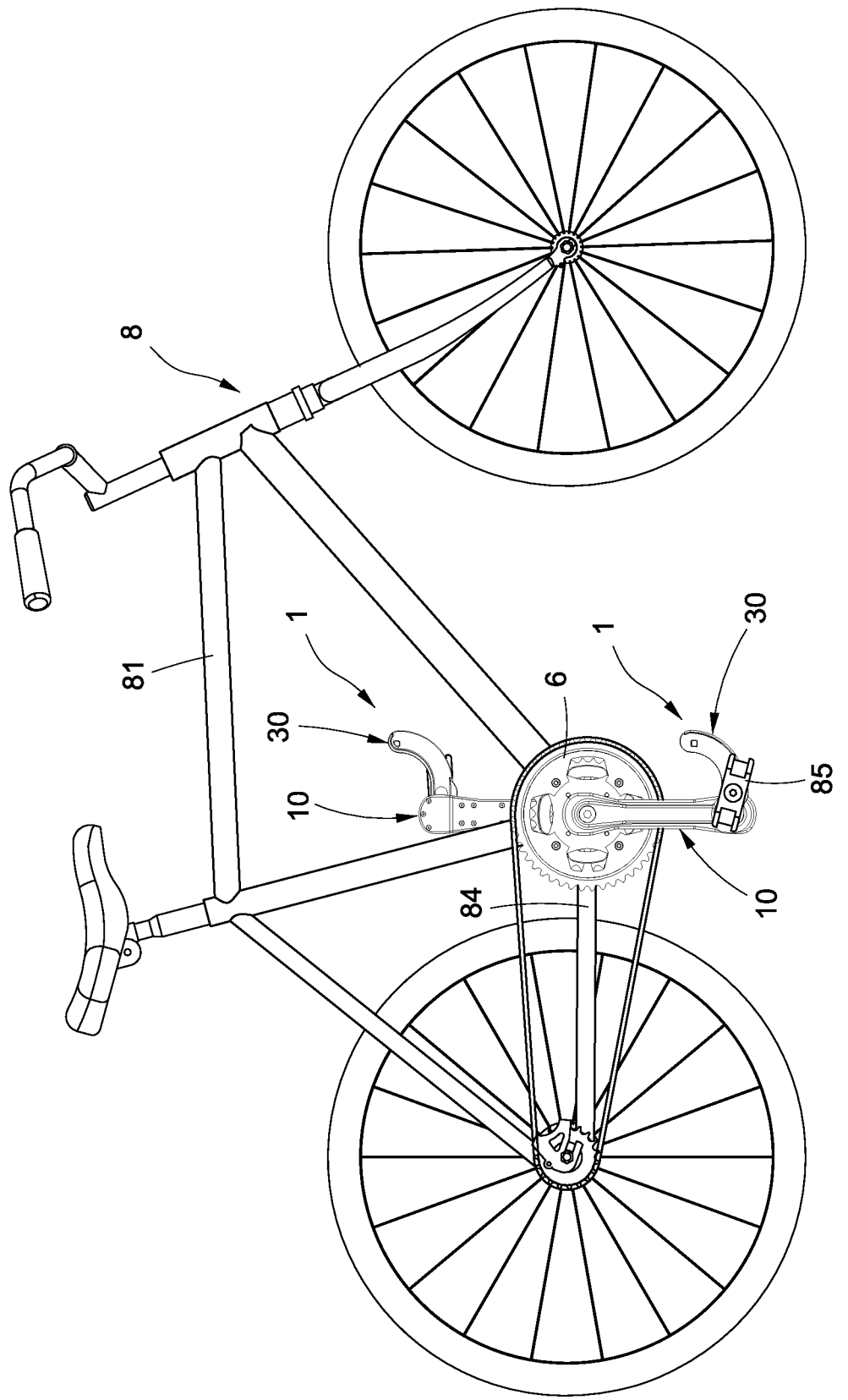
FIG. 8 is a structural view showing the effort-saving crank assembly being applied in a bicycle according to the present disclosure.
Figure 9:
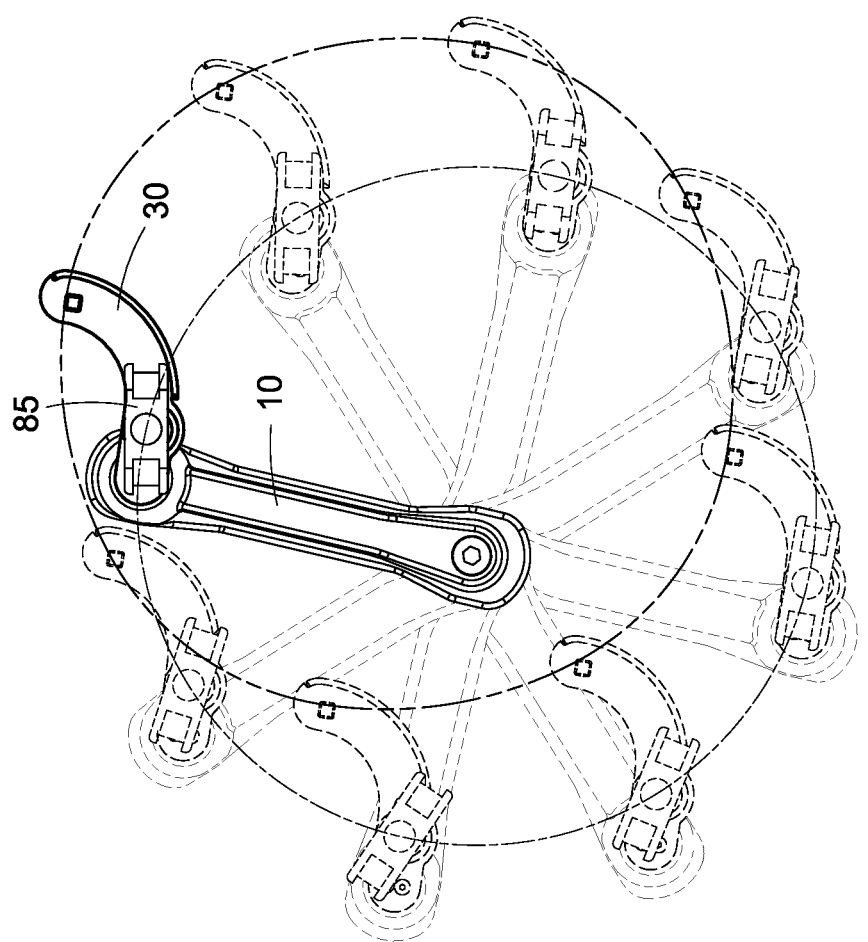
FIG. 9 is a schematic view showing an operating status of the effort-saving crank assembly according to the present disclosure.

Please refer to FIG. 8 and FIG. 9, which disclose the effort-saving crank assembly of the present disclosure being applied in a bicycle 8. The bicycle 8 includes a frame 81, a central shaft engage seat 82 disposed at a bottom end of the frame 81, a left fork 83 extended from the central shaft engage seat 82 toward a direction of a rear wheel and a right fork 84 formed at a right side of the left fork 83. The bicycle 8 further includes a set of treadles 85, a set of mounting rings 86 and other necessary components.

When being assembled, the central shaft 4 is inserted in the central shaft engage seat 82, each of the mounting rings 86 is locked on the central shaft engage seat 82 to limit the central shaft 4 in the central shaft engage seat 82, and the central shaft 4 may be rotated in the central shaft engage seat 82. Each of the abutting members 5 is correspondingly mounted and positioned with each of the mounting rings 86 to make each of the abutting members 5 be located at two sides of the central shaft engage seat 82, the abutting rod 53 of the abutting member 5 at the left side abuts against a bottom edge of the left fork 83, and the abutting rod 53 of the abutting member 5 at the right side abuts against a top edge of the right fork 84. The rectangular conical column 421 of the central shaft 4 is sheathed by the rectangular conical hole 115 of the round column 112, and each of the insertion strips 122 of the shaft end gear 12 is correspondingly mounted and combined with each of the mounting slots 512 of the ring member 51. Lastly, the screw bolt 43 is utilized to pass the round column 112 of the crank 11 and correspondingly locked in the screw hole 422 of the central shaft 4. As such, the central shaft 4 may be driven by rotations of the crank 11 to generate rotating motions.

Details are provided as follows. A force applying arm defined at connecting locations of a shaft core of the shaft end gear 12 to the first rotation arm 31 and to the second rotation arm 32 is greater than a length of the crank 11. According to the principle of moment (M=F×d, F: action force, d: moment arm), the greater moment arm needs the less applied action force under a situation of requiting the same moment.

When being operated, the action force is applied through the treadle 85, the crank mechanism 10 drives the central shaft 4 and the chain wheel 6 to rotate with the crank 11 via the round column 112. When the rotation arm unit 30 downwardly rotates from an apex position, the first gear 22 is driven by the shaft end gear 12 to make the rotation shaft 21 and the second gear 23 be driven to generate rotations, and the treadle end gear 13 is driven through the second gear 23, thus a constant angle defined between the rotation arm unit 30 and the ground may be kept, a motion track at a center of the treadle 85 forms a motion similar to a circular motion. Moreover, a moving direction of the rotation arm unit 30 is opposite to a moving direction of the crank 11.

While this disclosure has been described by means of specific embodiments, numerous modifications and variations could be made thereto by those skilled in the art without departing from the scope and spirit of this disclosure set forth in the claims.

What is claimed is:

1. A crank structure (1) of a bicycle (8), the crank structure comprising:
   a crank mechanism (10), comprising a crank (11), a shaft end gear (12) disposed on one end of the crank (11) and a treadle end gear (13) disposed on another end of the crank (11);
   a transmission mechanism (20), disposed in the crank (11) and comprising a rotation shaft (21) and a first gear (22) and a second gear (23) connected to two ends of the rotation shaft (21), wherein the first gear (22) and the shaft end gear (12) are engaged for transmission, and the second gear (23) and the treadle end gear (13) are engaged for transmission; and
   a rotation arm unit (30), comprising a first rotation arm (31) and a second rotation arm (32), wherein two ends of the second rotation arm (32) are respectively connected to one end of the first rotation arm (31) and the treadle end gear (13);
   wherein the transmission mechanism (20) further comprises a connection shaft sleeve (24), the rotation shaft (21) comprises a first rotation shaft (211) and a second rotation shaft (212), the first gear (22) is connected to one end of the first rotation shaft (211), the second gear (23) is connected to one end of the second rotation shaft (212), the connection shaft sleeve (24) is adapted to sheathe another end of the first rotation shaft (211) and another end of the second rotation shaft (212) and is rotatable with the first rotation shaft (211) and the second rotation shaft (212).

2. The crank structure (1) according to claim 1, wherein the crank (11) comprises an outer housing (111) and an inner housing (116) correspondingly engaged with the outer housing (111), the outer housing (111) comprises a first connection hole (113), the inner housing (116) comprises a shaft sleeve (118) extended therefrom, the treadle end gear (13) comprises a front convex column (131) and a rear convex column (132) respectively extended from two ends thereof, the front convex column (131) is disposed corresponding to the first connection hole (113), the rear convex column (132) is jointly disposed in the shaft sleeve (118) with a bearing (14) to make the treadle end gear (13) be supported between the outer housing (111) and the inner housing (116).

3. The crank structure (1) according to claim 2, wherein the outer housing (111) comprises a round column (112) extended therefrom, the inner housing (116) comprises a second connection hole (117), the shaft end gear (12) is disposed in the second connection hole (117) and adapted to sheathe the round column (112).

4. The crank structure (1) according to claim 3, wherein the front convex column (131) comprises a positioning plane (134), the second rotation arm (32) comprises a mounting slot (324) and a latching plane (325) disposed in the mounting slot (324), the front convex column (131) is disposed in the mounting slot (324), and the latching plane (325) and the positioning plane (134) are mutually latched.

5. The crank structure (1) according to claim 4, wherein the front convex column (131) comprises two positioning holes (135) defined on an end surface thereof, the second rotation arm (32) comprises two through holes (326) communicating with the mounting slot (324), and each of the positioning holes (135) is disposed corresponding to each of the through holes (326) to allow a screw to pass and be locked.

6. The crank structure (1) according to claim 1, wherein the crank (11) comprises an outer housing (111) and an inner housing (116) correspondingly engaged with the outer housing (111), the transmission mechanism (20) further comprises a plurality of fixed shaft sleeves (25) and a plurality of positioning shaft sleeves (26), each of the fixed shaft sleeves (25) is adapted to sheathe the first rotation shaft (211) and the second rotation shaft (212) at intervals and sandwiched between the inner housing (116) and the outer housing (111), and each of the positioning shaft sleeves (26) is adapted to sheathe the first rotation shaft (211) and the second rotation shaft (212) at intervals and disposed between any two of the fixed shaft sleeves (25) adjacent to each other.

7. A crank assembly of a bicycle (8), the bicycle (8) comprising a central shaft engage seat (82), and the crank assembly comprising:
a central shaft (4), disposed in the central shaft engage seat (82);
a set of crank structures (1), respectively connected to two ends of the central shaft (4), wherein each of the crank structure (1) comprises a crank mechanism (10), a transmission mechanism (20) and a rotation arm unit (30), the crank mechanism (10) comprises a crank (11), a shaft end gear (12) disposed on one end of the crank (11) and a treadle end gear (13) disposed on another end of the crank (11), the transmission mechanism (20) is disposed in the crank (11) and comprises a rotation shaft (21) and a first gear (22) and a second gear (23) connected to two ends of the rotation shaft (21), the first gear (22) and the shaft end gear (12) are engaged for transmission, and the second gear (23) and the treadle end gear (13) are engaged for transmission, the rotation arm unit (30) comprises a first rotation arm (31) and a second rotation arm (32), and two ends of the second rotation arm (32) are respectively connected to one end of the first rotation arm (31) and the treadle end gear (13); and
a set of abutting members (5), each of the abutting members (5) adapted to sheathe each of the shaft end gears (12) and located between each of the cranks (11) and the central shaft engage seat (82);
wherein the bicycle (8) further comprises a left fork (83) and a right fork (84) connected to the central shaft engage seat (82), each of the abutting members (5) comprises a ring member (51), an arm member (52) extended from the ring member (51) and an abutting rod (53) connected to one end of the arm member (52) away from the ring member (51), one of the abutting rods (53) is configured to abut against a bottom edge of the left fork (83), and another one of the abutting rods (53) is configured to abut against a top edge of the right fork (84).

8. The crank assembly according to claim 7, further comprising a chain wheel (6) adapted to sheathe one of the shaft end gears (12) and disposed between one of the cranks (11) and one of the abutting members (5).

9. The crank assembly according to claim 7, wherein each of the cranks (11) comprises an outer housing (111) and an inner housing (116) correspondingly engaged with the outer housing (111), the outer housing (111) comprises a first connection hole (113), the inner housing (116) comprises a shaft sleeve (118) extended therefrom, the treadle end gear (13) comprises a front convex column (131) and a rear convex column (132) respectively extended from two ends thereof, the front convex column (131) is disposed corresponding to the first connection hole (113), the rear convex column (132) is jointly disposed in the shaft sleeve (118) with a bearing (14) to make the treadle end gear (13) be supported between the outer housing (111) and the inner housing (116).

10. The crank assembly according to claim 9, wherein the outer housing (111) comprises a round column (112) extended therefrom, the inner housing (116) comprises a second connection hole (117), the shaft end gear (12) is disposed in the second connection hole (117) and adapted to sheathe the round column (112).

11. The crank assembly according to claim 10, wherein the front convex column (131) comprises a positioning plane (134), the second rotation arm (32) comprises a mounting slot (324) and a latching plane (325) disposed in the mounting slot (324), the front convex column (131) is disposed in the mounting slot (324), and the latching plane (325) and the positioning plane (134) are mutually latched.

12. The crank assembly according to claim 11, wherein the front convex column (131) comprises two positioning holes (135) defined on an end surface thereof, the second rotation arm (32) comprises two through holes (326) communicating with the mounting slot (324), and each of the positioning holes (135) is disposed corresponding to each of the through holes (326) to allow a screw to pass and be locked.

13. The crank assembly according to claim 7, wherein each of the transmission mechanisms (20) further comprises a connection shaft sleeve (24), the rotation shaft (21) comprises a first rotation shaft (211) and a second rotation shaft (212), the first gear (22) is connected to one end of the first rotation shaft (211), the second gear (23) is connected to one end of the second rotation shaft (212), the connection shaft sleeve (24) is adapted to sheathe another end of the first rotation shaft (211) and another end of the second rotation shaft (212) and is rotatable with the first rotation shaft (211) and the second rotation shaft (212).

14. The crank assembly according to claim 13, wherein each of the cranks (11) comprises an outer housing (111) and an inner housing (116) correspondingly engaged with the outer housing (111), wherein each of the transmission mechanisms (20) further comprises a plurality of fixed shaft sleeves (25) and a plurality of positioning shaft sleeves (26), each of the fixed shaft sleeves (25) is adapted to sheathe the first rotation shaft (211) and the second rotation shaft (212) at intervals and sandwiched between the inner housing (116) and the outer housing (111), and each of the positioning shaft sleeves (26) is adapted to sheathe the first rotation shaft (211) and the second rotation shaft (212) at intervals and disposed between any two of the fixed shaft sleeves (25) adjacent to each other.

* * * * *